United States Patent [19]
Dragoset, Jr.

[11] Patent Number: 5,365,492
[45] Date of Patent: Nov. 15, 1994

[54] METHOD FOR REVERBERATION SUPPRESSION

[75] Inventor: William H. Dragoset, Jr., Houston, Tex.

[73] Assignee: Western Atlas International, Inc., Houston, Tex.

[21] Appl. No.: 101,949

[22] Filed: Aug. 4, 1993

[51] Int. Cl.⁵ ............................................. G01V 1/38
[52] U.S. Cl. ........................................ 367/21; 367/24; 181/110
[58] Field of Search ................... 367/21, 24; 181/110, 181/120

[56] References Cited

U.S. PATENT DOCUMENTS

| | | | |
|---|---|---|---|
| 4,253,164 | 2/1981 | Hall, Jr. | 367/22 |
| 4,910,716 | 3/1990 | Kirlin et al. | 367/24 |
| 4,979,150 | 12/1990 | Barr | 367/24 |
| 5,163,028 | 11/1992 | Barr et al. | 367/13 |
| 5,235,554 | 8/1993 | Barr et al. | 367/13 |
| 5,251,183 | 10/1993 | McConnell et al. | 367/21 |
| 5,257,241 | 10/1993 | Henderson et al. | 367/15 |

OTHER PUBLICATIONS

Widrow, B., Glover, J. R., McCool, J. M. Kaunitz, J., Williams, C. S., Hearn, R. H., Zeidler, J. R., Dong, E., Goodlin, R. C. "Adaptive Noise Cancelling: Principles and Applications", Proceedings of the IEEE, vol. 63, No. 12, Dec. 1975.

Primary Examiner—J. Woodrow Eldred
Attorney, Agent, or Firm—William A. Knox

[57] ABSTRACT

A method for reducing the effects of reverberation on noisy seismic wavefields recorded from within a moisture-laden environment. The wavefield manifests itself as a pressure signature and a velocity signature that contains an embedded nose signature. The pressure signature is adaptively filtered and subtractively combined with the velocity signature to isolate a nearly pure noise signature. The nearly pure noise signature is added back to the original velocity signature with opposite sign to clear away the embedded noise, leaving a refined velocity signature. The refined velocity signature iteratively is scaled and summed with the pressure signature, incrementing the scale factor at each iteration and autocorrelating the sum. A coefficient of convergence is calculated after each summation. The coefficient of convergence that most closely approaches unity identifies the preferred scale factor.

15 Claims, 3 Drawing Sheets

METHOD FOR REVERBERATION SUPPRESSION

BACKGROUND OF THE INVENTION

1. Field of the Invention

This invention teaches an improved method for processing data received by paired seismic sensors, the sensors being of different genera. More specifically, the method relates to suppression of water-column reverberation interference that is sometimes seen during marine seismic surveys in relatively shallow water.

2. Description of Relevant Art

During the course of a marine seismic survey, a long string of sonic sensors is towed through the water. Periodically, an acoustic source is caused to insonify the subsurface earth layers thereby to generate a reflected seismic wavefield that is detected by the sensors and converted to electrical signals which are transmitted through the cable to the ship. The signals are recorded and later processed for the purpose of displaying the topography of the targeted subsurface earth layers.

In a marine environment, the reflected wavefield makes itself manifest as a variation in hydrodynamic pressure or as a variation in particle velocity. The sensors may be of different genera. That is, they may be designed to measure pressure variation (hydrophones) or particle velocity (geophones). One or the other or both types of sensor may be installed on the same string depending upon the problem to be overcome in the field. Less commonly, accelerometers may be used.

In relatively shallow water on the order of 25–200 feet, so-called bay cables are used. Here, the sensor string is emplaced directly upon the water bottom instead of being continuously towed behind a ship as is done in deep water. Customarily, gimbal-mounted geophones are the sensors of choice for measuring the particle velocity of the sea floor. Hundreds or even thousands of sensors may be deployed, the electrical outputs of the sensors being multiplexed into suitable data recorders.

FIG. 1 shows a ship 10 for handling bottom cable 12 resting on the water bottom 16 beneath a body of water 14. The water surface 18 forms a reflective air/water interface as is well known. The water bottom usually is also a good reflector depending upon the acoustic impedance. Velocity sensor (geophone) 20 and pressure sensor (hydrophone) 22 are co-located on the bottom and are coupled to separate electrical channels in cable 12 through which their signals are sent to archival storage and processing equipment (not shown) on ship 10. For simplicity, only two sensors are shown. Periodically, source 13 generates an acoustic wavefield 15 that propagates into earth 17 whence it is reflected from subsurface strata to return as a reflected wavefield such as 24. Source 13 may be fired by ship 10 or by a separate shooting boat (not shown).

An upcoming reflected compressional wavefield arrival 24 strikes geophone 20 on the bottom and by industry standard, generates a positive-going electrical impulse as shown at 26, FIG. 2. The reflected event continues upward to strike the air/water interface 18 whence it is reflected back downward, after a 180° phase reversal, as a ghost reflection to strike the geophone from the top. Normally, a compressional pulse applied to the top of a geophone produces a negative-going electrical impulse, but because of the phase reversal at the water surface, the first ghost reflection creates a second positive-going electrical impulse 30, FIG. 2, plotted with respect to an arbitrary amplitude scale. Depending upon the acoustic impedance of the water bottom and the water-surface smoothness, wavefields may bounce (reverberate) back and forth betwixt surface and bottom many times much like the multiple reflections seen in the mirrors on opposite walls of a barber shop. The second ghost reflection or multiple 32 is a negative pulse. Subsequent multiples are of alternately positive and negative polarity. Interfering multiple reflections wreak havoc with the recorded data. Reverberation effects have been observed in moisture laden regions such as low-tide beach sand and quicksand.

A hydrophone 22 sees an upcoming reflected compressional wavefield arrival as pulse of compression. Again by industry standard, the hydrophone converts a compressional pulse to a positive-going electrical impulse such as 36, FIG. 3, plotted to the same arbitrary amplitude scale as FIG. 2. The first ghost reflection from the surface travels downwardly as a rarefaction pulse which hydrophone 22 sees as a negative-going electrical impulse 40. The second ghost reflection 42 due to the second bounce between the bottom and the surface will be positive. Subsequent multiples will alternately exhibit negative and positive signatures.

The time interval, $\tau$, between pulses is the product of twice the apparent water depth multiplied by the water slowness $(1/v)$. For normal incidence as at 28 and 38 (FIG. 1), the apparent depth is the true water depth. Otherwise as for wavefield 44 and path 45, the apparent depth is the product of twice the water depth and the water slowness divided by the cosine of the angle of incidence, $\alpha$.

Thus, whereas the geophone sees the first reflected arrival and the first ghost arrival as electrical impulses of the same polarity, the hydrophone sees the first reflected arrival and the first ghost arrival as electrical impulses of opposite polarity. Therefore, by using two co-located sensors of different genera and combining their signatures, one should be able to constructively reinforce the first arrival energy and to destructively cancel the subsequent reverberant multiples. A second benefit emerges in that the random noise as seen by the different sensor types is not necessarily the same or correlatable.

A successful merging of the hydrophone and geophone signals requires that the signals from one of the sensor types be scaled to fit the signal from the other type of sensor. Their transfer functions must be matched in phase, amplitude, frequency and damping.

The most straight-forward scaling method would be to demultiplex the sets of recorded seismic data from the two sensors, remove instrumental gain effects, and amplitude-balance the signals using identical amplitude recovery functions for both data sets. The amplitude ratio between the respective first arrivals is the scale factor. However, the presence of noise and other disturbances make that method over-simplistic.

E. M. Hall, Jr. in U.S. Pat. No. 4,253,164, issued Feb. 24, 1981 and assigned to the assignee of this invention, teaches an electrical network for matching the transfer function of an accelerometer or a hydrophone to that of a geophone.

U.S. Pat. No. 5,163,028, issued Nov. 10, 1992 to F. J. Barr teaches an algorithm for deterministically computing a transfer function for matching a hydrophone to a geophone and for compensating for coupling imperfections of the sensors to the water bottom. The method requires use of a special calibration wavefield that is generated from a shot located directly above selected co-located sensors. The calibration shot is generally fired just prior to the beginning a seismic survey.

In U.S. Pat. No. 4,979,150, issued Dec. 18, 1990, also to F. J. Barr, there is taught a computer program for deriving a scale factor for use with a hydrophone co-located with a geophone for attenuating water-column reverberations. The sensors may be positioned at a point in the water above the water bottom or they can be located on the water bottom. The scale factor which derives from the acoustical impedance of the water or the water bottom material can be calculated either deterministically or statistically. In the former case, use is made of a calibration shot fired directly above the sensors as with the previous reference. The statistical methods have no specific requirement for positioning of shot and sensors as is required for the deterministic method. Statistical methods involve iteratively computing ratios between various combinations of auto- and cross-correlation functions of the wavetrains recorded by the respective sensors. Corrections may be introduced for wavefield directivity based upon raypath angularities.

Adaptive noise filtering, a concept that will be introduced later, is explained in *Adaptive Noise Canceling: Principles and Applications* by Bernard Widrow et al., published in the Proceeding of the IEEE, v. 63, n. 12, December, 1975, pp.1692-1716.

Objections to the above known methods for computing the scale factor involve first, the problem of random noise. In particular, velocity sensors (geophones) are quite noisy relative to hydrophones. With respect to the statistical methods, the geophone noise necessarily contaminates the results of the correlation processes. Second, in the iterative process of determining the scale factor from the cross- or auto-correlation ratios, there is no suggestion of a coefficient of convergence to pinpoint the best-fitting scale factor. Furthermore, simple summation of the data from the two sensors as taught by Barr can decrease the signal-to-noise ratio of the summed result relative to that of the hydrophone.

Repeated reference will be made to "water velocity" or "velocity signature". Unless otherwise qualified, the term "velocity" is a short-hand term that means the particle velocity of a medium (earth or water) caused by the passage therethrough of a seismic wavefield. If the word velocity is used in any other sense, it will be so qualified. The terms pressure signature, noise signature and velocity signature refer to the quantitative variation of the amplitude level of the respective parameters as function of time. The collective term "noise signature" includes any and all undesired signals whereas "pressure" and "velocity" signatures are the sought-after seismic signals useful for exploration.

There is a need for an improved method for statistically determining the scale factor between the impulse responses of a hydrophone and a geophone that will not be distorted by noise. Further, there is a need for a method for positively defining a coefficient of convergence for identifying the optimum scale factor and for lessening the impact of geophone noise on the summed data.

SUMMARY OF THE INVENTION

This invention provides an improved method for processing seismic data for the purpose of suppressing water-column reverberations. In accordance with the method, a reflected wavefield is created in a body of water. The reflected wavefield is characterized by pressure and velocity signatures that include embedded noise. The pressure and velocity signatures are detected concurrently at selected juxtaposed positions. The noise signature of the geophone is adaptively estimated from the velocity signature and the pressure signature. The noise signature is added back to the velocity signature with opposite polarity to form a clean refined velocity signature. A selected scale factor is applied to the refined velocity signature and the pressure signature is summed with the scaled refined velocity signature. The summed signature is auto-correlated.

A varimax function is computed for the sum signature. The above steps are repeated a number of times, incrementing the scale factor at each iteration until the varimax function most closely approaches unity.

In an aspect of this invention, the noise extracting step includes the step of adaptively canceling the signal from the embedded noise.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
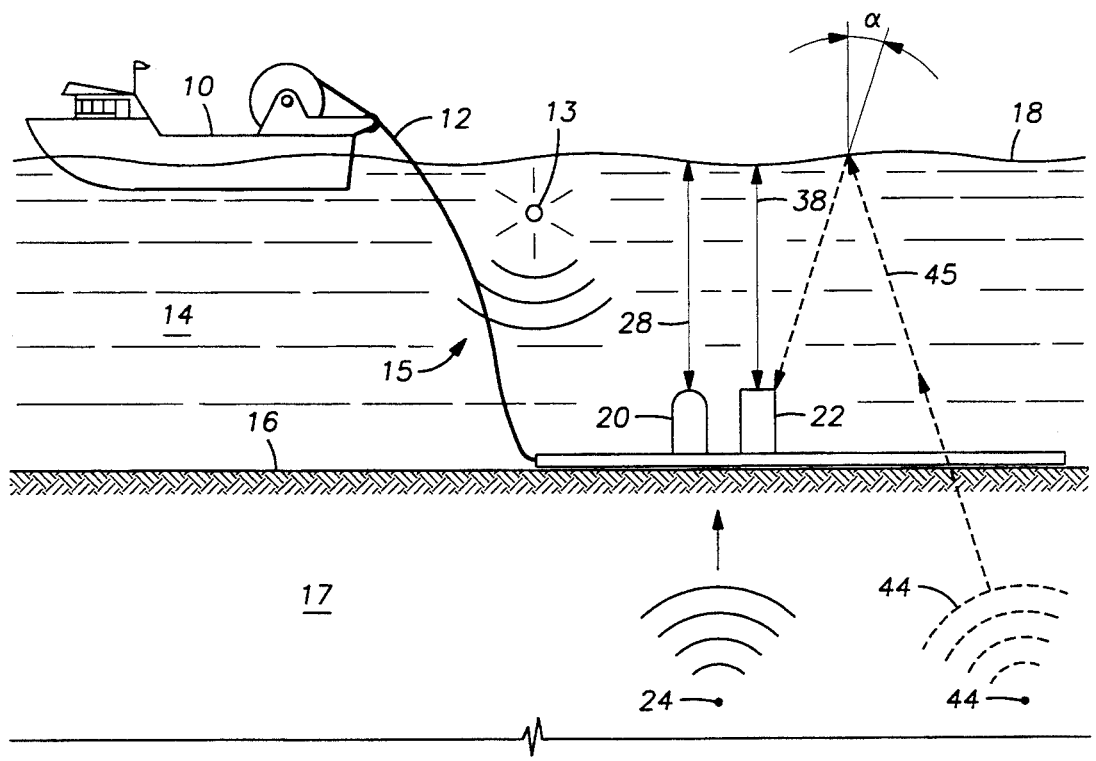
FIG. 1 shows the positioning of two seismic sensors of different genera emplaced upon a shallow-water bottom.
Figure 2:
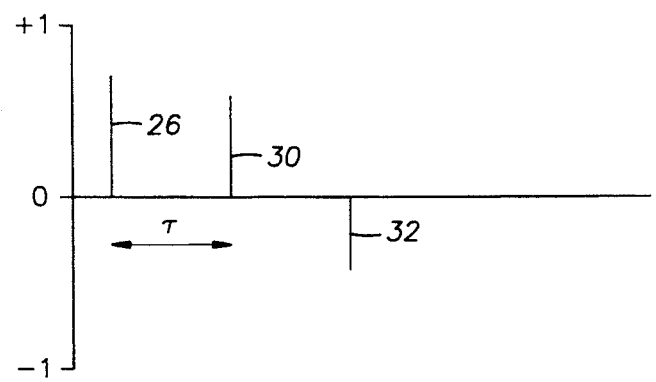
FIG. 2 shows the response of a velocity sensor to primary and ghost reflections.
Figure 3:
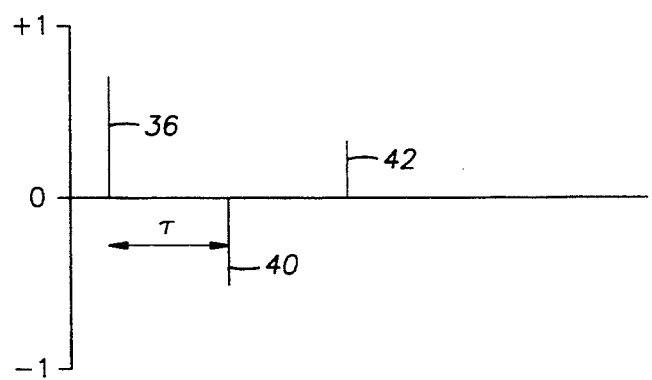
FIG. 3 shows the response of a pressure sensor to primary and ghost reflections.

At first glance, as earlier pointed out, it would appear that a summation of the geophone output with the amplitude-equalized output of a co-located hydrophone would cancel multiple reflections. The solution to the problem is somewhat more complex. Geophones are inherently noisy as compared to hydrophones. That noise must somehow be removed. The signatures shown in FIGS. 2 and 3 are idealized as Dirac functions whereas in actual fact the signals consist of the idealized wave form convolved with the transient waveforms representing the transfer functions of the sensors.

In the ensuing discussion, it is to be understood that the data are in the form of discrete samples indexed as a function of reflection travel time.

We begin by filtering the hydrophone pressure signature to adaptively create a best estimate of a geophone velocity signature. The best estimated geophone signature is then subtracted from the corresponding real geophone signature which also includes an embedded noise signature. That step tends to cancel the geophone signature, thereby allowing us to recover a nearly pure noise signature. Meanwhile, conceptually at least, the original, real noisy geophone signal is temporarily stored. After the noise signature has been recovered, the original real geophone signature plus the embedded noise is next removed from storage and the corresponding noise signature is subtracted therefrom to provide a clean refined geophone signal. A scale factor is iteratively applied to the clean geophone signal which is summed with the hydrophone signal. The summation is autocorrelated after each iteration. A measure of the scale factor is suitably determined by a study of the main lobe and the first side lobes of the autocorrelation trace. Iteration continues until the suitability measure is maximized.

Figure 4:
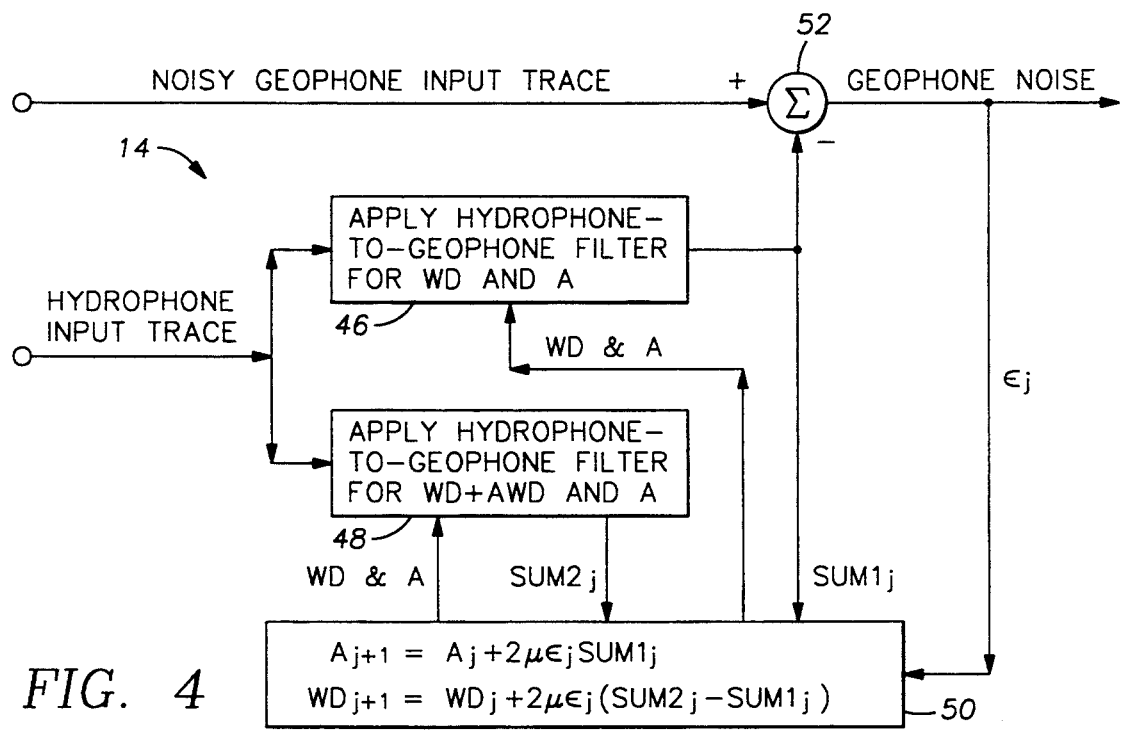
FIG. 4 shows a illustrates the adaptive noise recovery logic and an adaptive hydrophone to geophone filter.

FIG. 4 generally shows the mechanization of the adaptive noise recovery loop which operates on each data sample as a function of sample-time index, j. A hydrophone to geophone transform filter 47 includes blocks 46 and 48 which, for each sample, comprise an adaptive filter such as the well-known Wiener filter. The filter provides an estimate of the velocity signature with respect to amplitude, phase, frequency and damping. The hydrophone signal is input to block 46 of filter 47 where it is convolved with the estimated apparent water depth $WD_j$ and the filter amplitude response $A_j$, generating an estimated geophone signal $SUM1_j$. $SUM1_j$ is subtractively combined with the noisy geophone input trace at summation junction 52. The output is nearly pure geophone noise, $\epsilon_j$, which is entered into block 50 of filter 47. A feedback gain $\mu$ is applied. The feedback gain lies within a narrow range of from zero to about 0.01. If the gain is zero, the filter quits functioning. If the gain is too large, it becomes unstable. The feedback gain is therefore adjusted to provide a desired degree of adaptivity. The apparent water depth is incremented to produce a new hydrophone to geophone transform filter. The convolution process is repeated in block 48 using the new filter. If the difference $\Delta WD$ between the original and the updated filter improves the estimate of the geophone signal, the trial water depth increment becomes a permanent entry.

Figure 5:
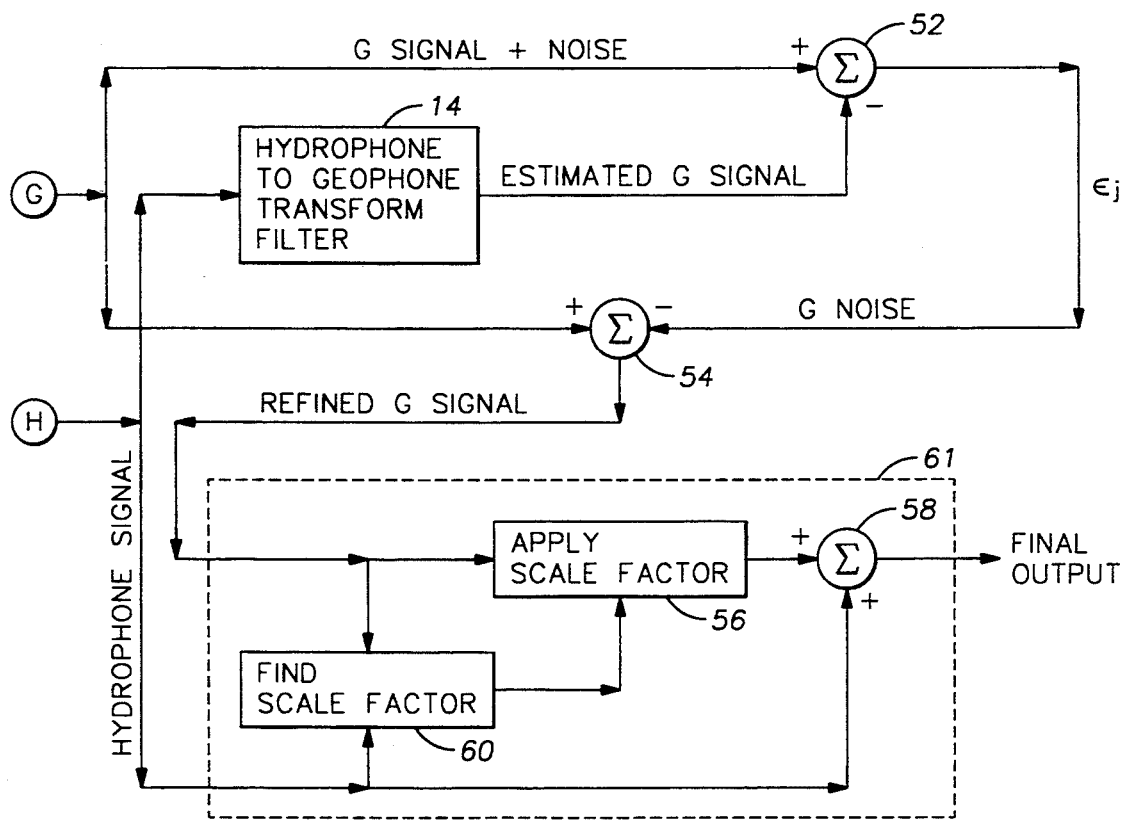
FIG. 5 shows the operational sequence for defining the method for scaling the velocity sensor signal to the pressure sensor signal.

Let us now refer to FIG. 5. In FIG. 5, the open circle enclosing the letter G represents the noisy geophone input signal (the velocity signature). The open circle enclosing the letter H represents the corresponding hydrophone input signal (the pressure signature). The nearly pure noise signature, $\epsilon_j$, uncontaminated by signal, from junction 48 of FIG. 4 is fed with opposite sign to the noisy geophone input signal G SIGNAL+NOISE at summation junction 54 to provide a clean geophone signal output called REFINED G SIGNAL in the Figure.

At 56, a scale factor is applied to the geophone signal and added to the hydrophone signal (the application sequence could be reversed) at summation junction 58 to produce the final output. The scale factor is derived in block 60 as will now be explained.

Given gathers of common-receiver-sorted and amplitude balanced corresponding hydrophone and geophone data sets, select a window of traces that are characterized by a reasonably-clean high-level signal. Estimate a scale factor for the refined geophone signal exhibited by the selected traces, apply the estimated scale factor and sum with the corresponding hydrophone traces. Autocorrelate the summation. Compute a coefficient of convergence and iterate, incrementing the scale factor at each iteration until a desired range of scale factors has been covered. Select, as the scale factor to be applied to the entire gather, that scale factor for which the coefficient of convergence is maximized, that is, for that value that most closely approaches unity.

The coefficient of convergence is most conveniently computed from the varimax function $$VM = \frac{\sum\limits_{i}^{n} x_i^4}{\left(\sum\limits_{i}^{n} x_i^2\right)^2}$$

where $x_i, i = 1, 2, 3, \ldots, n$ is a sequence of discrete data samples within a selected time gate along the autocorrelation function that includes the region where the central and principle side lobes of the autocorrelation function are to be expected. If x is a discrete spike, as shown in FIGS. 2 or 3, then $VM = 1$. The value of VM diminishes as the wavefield transient becomes less spike-like.

Figure 6:
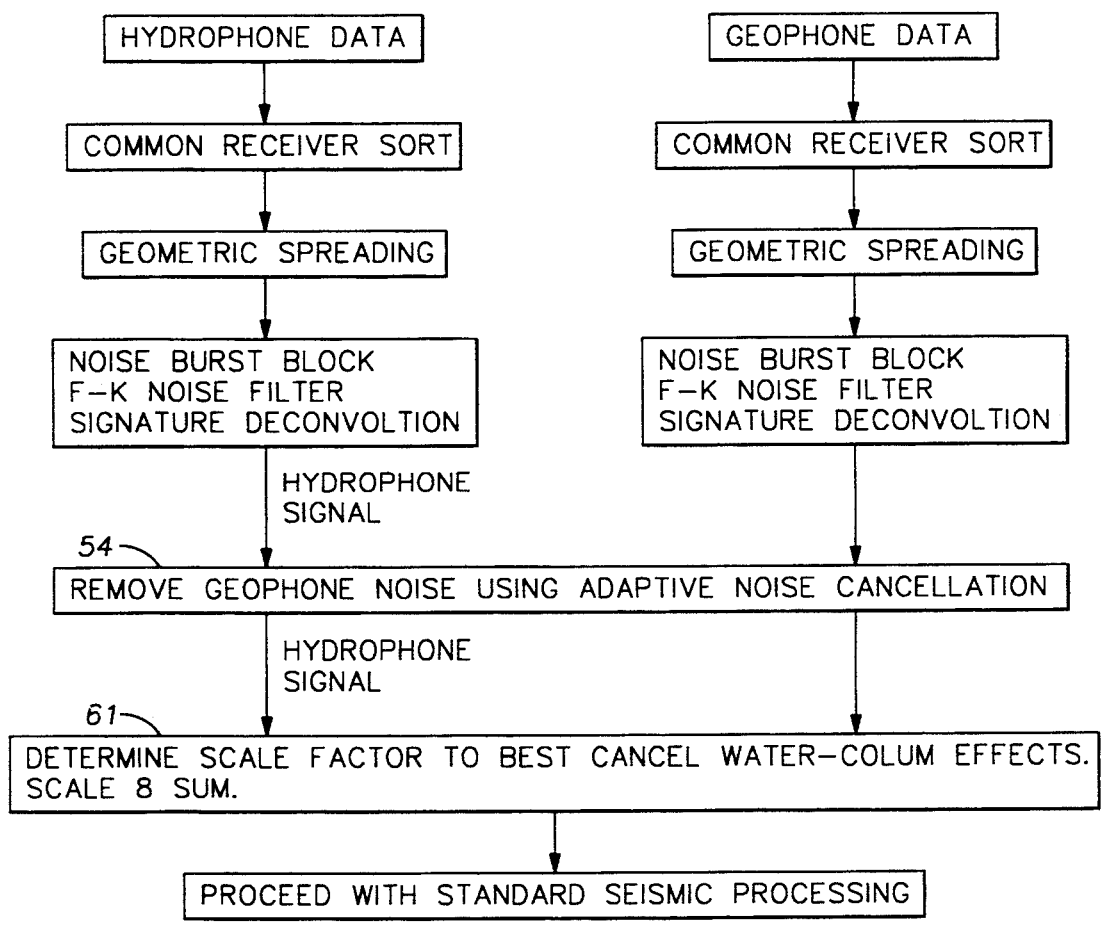
FIG. 6 is a flow diagram illustrating the presently preferred mode of operation.

The presently preferred mode of operation may be summarized in the flow diagram of FIG. 6. The hydrophone and the geophone data sets are each sorted to common receiver gathers. The data are reverse gain conditioned, amplitude balanced and corrected for geometric spreading in the usual manner. The now partially-processed data are treated for noise bursts, f-k filtered and the signatures are deconvolved. All of the foregoing is, of course standard procedure.

In block 54, the adaptive noise cancellation process is applied to the data sets as explained with respect to FIGS. 4 and 5. In block 61, the data sets are scaled relative to each other as explained in connection with FIG. 5, using the best estimated scale factor as indicated by the maximum value of the coefficient of correlation VM.

It is to be understood that although the method has been described with respect to bay-cable operations, it may also be applied to any sort of marine seismic surveys or to so-called transition zones where reverberation may be encountered in moist beach sand. Reference repeatedly has been made to the operation of scaling the geophone signal to that of the hydrophone. It is to be understood that the reverse process may be done, i.e., the hydrophone signal may be scaled to fit the geophone signal. The specific aspects are described for purposes of illustration and example and in no way limiting to the scope and spirit of this invention.

What is claimed is:

1. An improved method for processing seismic data for suppressing multiple reverberations, comprising:
   (a) creating a reflected seismic wavefield in a water environment, said seismic wavefield being characterized by a pressure signature, and a velocity signature that includes an embedded noise signature;
   (b) detecting the pressure signature of said reflected seismic wavefield at a selected location;
   (c) concurrently detecting the velocity signature of said reflected seismic wavefield at a location juxtaposed to said selected location;
   (d) filtering said pressure signature;
   (e) extracting said noise signature by subtractively combining said filtered pressure signature with said velocity signature;

(f) producing a refined velocity signature by adding the extracted noise signature to said velocity signature with opposite sign;

(g) applying a desired scale factor to said refined velocity signature and summing said pressure signature with said refined and scaled velocity signature; and (h) generating an auto-correlation function for the summed signature.

2. The method as defined by claim 1, comprising:

computing a coefficient of convergence for the auto-correlation function;

iterating through steps (g) to (h); and incrementing said desired scale factor at each iteration, until said coefficient of convergence most closely approaches unity.

3. The method as defined by claim 2, wherein:

the step of extracting includes the step of adaptively canceling said velocity signature from said embedded noise signature.

4. The method as defined by claim 3, wherein:

step (d) includes the step of filtering said pressure signature as a function of water depth prior to the step of subtractively combining.

5. The method as defined by claim 4 wherein:

the step of filtering includes the step of introducing a desired feedback gain factor to said noise signature.

6. The method as defined by claim 5, comprising:

adjusting said feedback gain factor to provide a desired degree of adaptivity.

7. The method as defined by claim 2, wherein:

said coefficient of convergence is defined by a varimax function.

8. The method as defined by claim 7, wherein:

said varimax function VM is calculated from $$VM = \frac{\sum\limits_{i}^{n} x_i^4}{\left(\sum\limits_{i}^{n} x_i^2\right)^2}$$

where the $x_i$, $i=1, 2, 3, \ldots, n$, are a sequence of discrete data samples taken from within a selected time gate along said autocorrelation function that includes the main and principle side lobes thereof.

9. An improved method for suppressing multiple reverberations from seismic data sets, comprising:

(a) generating a reflected seismic wavefield in a moisture-laden environment;

(b) measuring the pressure signature of said reflected wavefield at a selected location in said environment;

(c) concurrently measuring the particle-velocity signature of said reflected wavefield at substantially the same selected location in said environment, said particle-velocity signature including an unwanted noise signature;

(d) filtering said pressure signature;

(e) isolating said noise signature by subtractively applying said filtered pressure signature to said particle-velocity signature;

(f) refining said particle-velocity signature by subtracting said isolated noise signature therefrom;

(g) scaling the refined particle-velocity signature with respect to said pressure signature;

(h) summing said pressure signature with said particle-velocity signature;

(i) generating an autocorrelation function for the summed signatures; and (j) calculating a coefficient of convergence for said autocorrelation function.

10. The method as defined for claim 9, wherein:

step (g) comprises the step of scaling said pressure signature with respect to the refined particle-velocity signature.

11. The method as defined by claim 10, comprising:

calculating said coefficient of convergence from a varimax function.

12. The method as defined by claim 9, comprising:

iterating through steps (g) to (j); and incrementing said scale factor for each iteration until said coefficient of correlation most closely approaches unity.

13. The method as defined by claim 10, comprising:

iterating through steps (g) to (j); and incrementing said scale factor after each iteration until said coefficient of correlations most closely approaches unity.

14. The method as defined by claim 9, wherein:

step (d) includes the step of transforming said pressure signature to estimate said particle-velocity signature with respect to amplitude, phase, frequency and damping.

15. The method as defined by claim 14, wherein:

step (d) includes the step of filtering said pressure signature as a function of apparent water depth.

* * * * *